United States Patent [19]

Aboukrat et al.

[11] Patent Number: 4,703,212
[45] Date of Patent: Oct. 27, 1987

[54] DIRECT-CURRENT MOTOR

[75] Inventors: Simon Aboukrat, Garges lès Gonesse; Lucien Catoir, Clichy; Jean-Luc Guatelli, Montigny lès Cormeilles; Janusz Sobiepanek, Gif sur Yvette, all of France

[73] Assignee: Etudes Techniques et Representations Industrielles E.T.R.I., Neuilly-sur-Seine, France

[21] Appl. No.: 793,101

[22] Filed: Oct. 29, 1985

[30] Foreign Application Priority Data

Oct. 31, 1984 [FR] France .................. 84 16679

[51] Int. Cl.⁴ ............................................. H02K 1/18
[52] U.S. Cl. ...................................... 310/218; 310/42; 310/43; 310/67 R; 310/91; 310/154; 310/156
[58] Field of Search ............. 310/181, 154, 156, 67 R, 310/194, 91, 46, 269, 42, 216, 217, 218, 152, 43

[56] References Cited

U.S. PATENT DOCUMENTS

| | | | |
|---|---|---|---|
| 4,074,157 | 2/1978 | Lace | 310/194 |
| 4,259,603 | 3/1981 | Uchiyama | 310/194 |
| 4,280,072 | 7/1981 | Gotou | 310/156 |
| 4,357,563 | 11/1982 | Ohno | 310/156 |

FOREIGN PATENT DOCUMENTS

| | | |
|---|---|---|
| 2061391 | 12/1970 | Fed. Rep. of Germany . |
| 3108392 | 9/1982 | Fed. Rep. of Germany . |
| 2315190 | 1/1977 | France . |
| 2468250 | 4/1981 | France . |
| 55-155570 | 12/1980 | Japan . |

Primary Examiner—R. Skudy
Attorney, Agent, or Firm—Young & Thompson

[57] ABSTRACT

A direct-current motor in which a rotor is provided with at least two regions having opposite permanent magnetic polarities and located opposite to an annular air-gap. The stator is constituted by at least one winding and one magnetic circuit comprising at least one yoke connected by means of arms surrounded in one case by the winding to at least two pole horns located opposite to the air-gap. At least one auxiliary permanent magnet is engaged within a space formed between two circumferential ends of the two pole horns, the ends being directed towards each other. The permanent magnet forms a longitudinal projection carried by a supporting post housed within an inter-pole space between the yoke and the two adjacent horns. The post is carried by an annular plate which is placed on an axial end face of the magnetic circuit.

9 Claims, 7 Drawing Figures

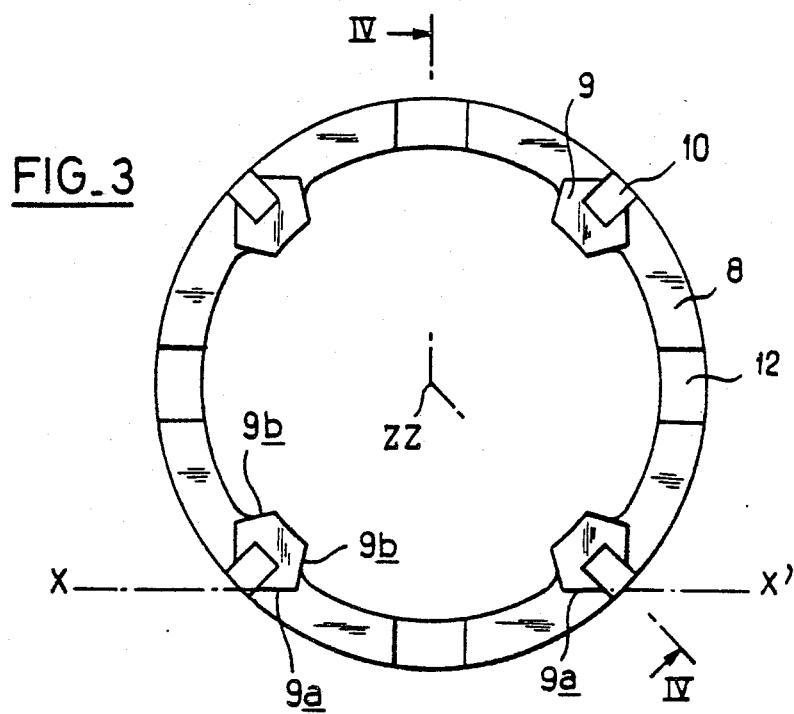
FIG_3
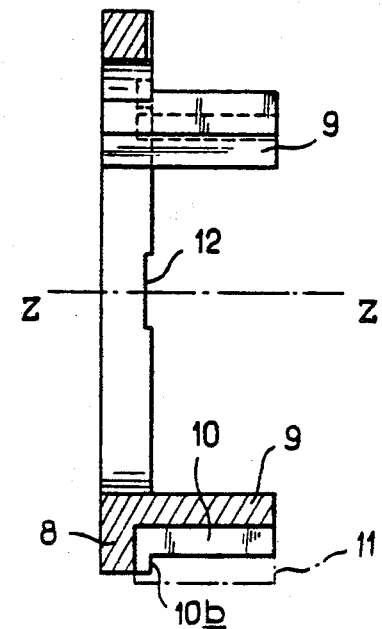
FIG_4

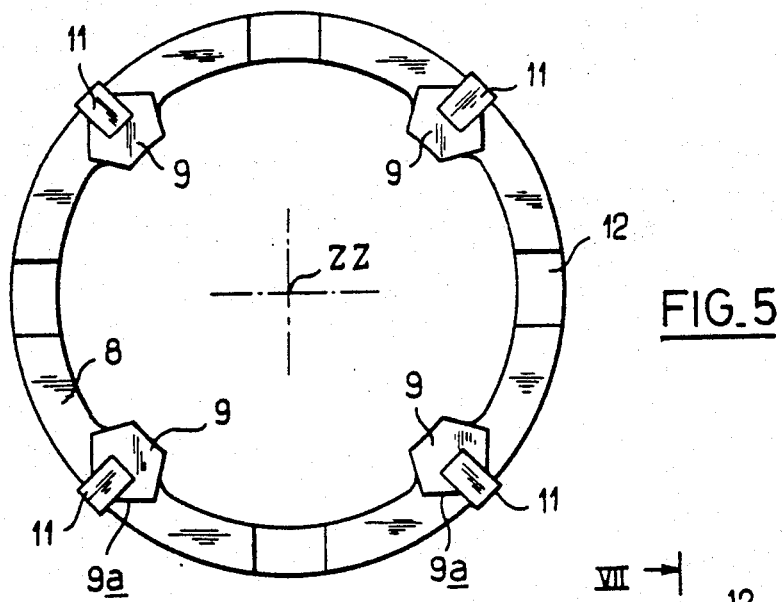
FIG. 5
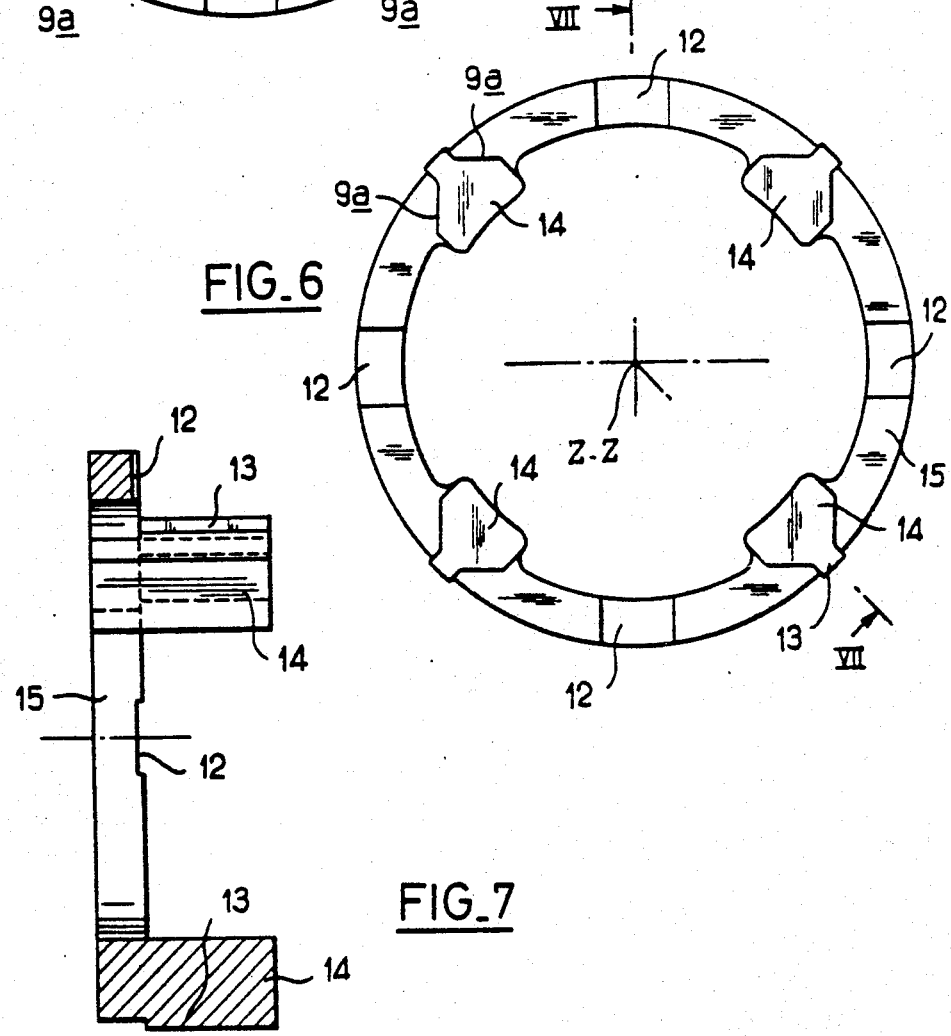
FIG. 6
FIG. 7

DIRECT-CURRENT MOTOR

BACKGROUND OF THE INVENTION

The present invention relates to a direct-current motor of the electronic commutation type, for example, and comprising a permanent-magnetism element (such as a rotor, for example) which is provided opposite to an annular air-gap with at least two regions having opposite permanent magnetic polarities. This element is mounted for rotational motion relative to an electromagnetic element (such as a stator, for example) constituted on the one hand by at least one winding and on the other hand by at least one magnetic circuit which in turn comprises at least one yoke connected by means of arms surrounded in one case by the winding to at least two pole horns located opposite to the above-mentioned air-gap. The motor comprises in addition at least one auxiliary permanent magnet engaged within a spatial interval between two circumferential ends of the two pole horns, said ends being directed towards each other. The above-mentioned permanent magnet forms a longitudinal projection carried by a support housed within an inter-pole space provided between the yoke and the two adjacent horns.

By suitable current commutation within the winding, the pole horns interact magnetically with the permanent magnetic regions of the other element, thus giving rise to a torque which tends to produce rotation of one element with respect to the other. When the motor is at rest, the auxiliary magnet interacts with the permanent magnetic regions in order to return these latter to an angular position in which their magnetic axis is moved away from the axis of the pole horns. In fact, when the above-mentioned magnetic axes are in substantially coincident relation, excitation of the winding does not give rise to any significant torque and the auxiliary magnet thus constitutes a simple means for permitting startup of the motor simply by excitation of the winding without requiring any ancillary starting device.

German patent N° DE-A-31 08 392 describes a practical application of this simple means. In this specification, a support is provided for each auxiliary magnet. At the time of assembly, each support provided with its auxiliary magnet is introduced individually in a longitudinal groove formed between the pole horns of the electromagnetic element. It is therefore necessary to place the auxiliary magnets within the electromagnetic element one by one. Furthermore, the electromagnetic element must have a special shape for the purpose of retaining the magnet supports. This not only entails the need for a special construction involving high capital cost but also reduces the useful surface area and consequently has the further effect of reducing the useful electromagnetic flux while at the same time disturbing the magnetic stator field.

SUMMARY OF THE INVENTION

The object of the present invention is thus to propose a motor provided with means which are conducive to ease of assembly of the auxiliary magnet or magnets without producing any detrimental effect on its good performance or modifying the characteristics of the electromagnetic element.

In accordance with the invention, the distinctive feature of the motor lies in the fact that the support is a post carried by an annular plate placed on an axial end face of the magnetic circuit.

Thus, during manufacture, the annular plate is easy to handle and to mount on the electromagnetic element in conjunction with correlative positioning of the post in the inter-pole space and of the magnet in the space between horns.

BRIEF DESCRIPTION OF THE DRAWINGS

Other features of the invention will be more apparent upon consideration of the following description and accompanying drawings, wherein:

FIG. 3 illustrates the support alone, in the axial direction of FIG. 1;

FIG. 4 is a view of the support, this view being taken in cross-section along line IV—IV of FIG. 3;

FIG. 5 is a view which is similar to FIG. 3 but includes the auxiliary magnets;

FIG. 6 is a view which is similar to FIG. 5 but relates to an alternative embodiment;

FIG. 7 is a view of the support, this view being taken in axial cross-section along line VII—VII of FIG. 6.

DESCRIPTION OF THE PREFERRED EMBODIMENTS

Figure 1:
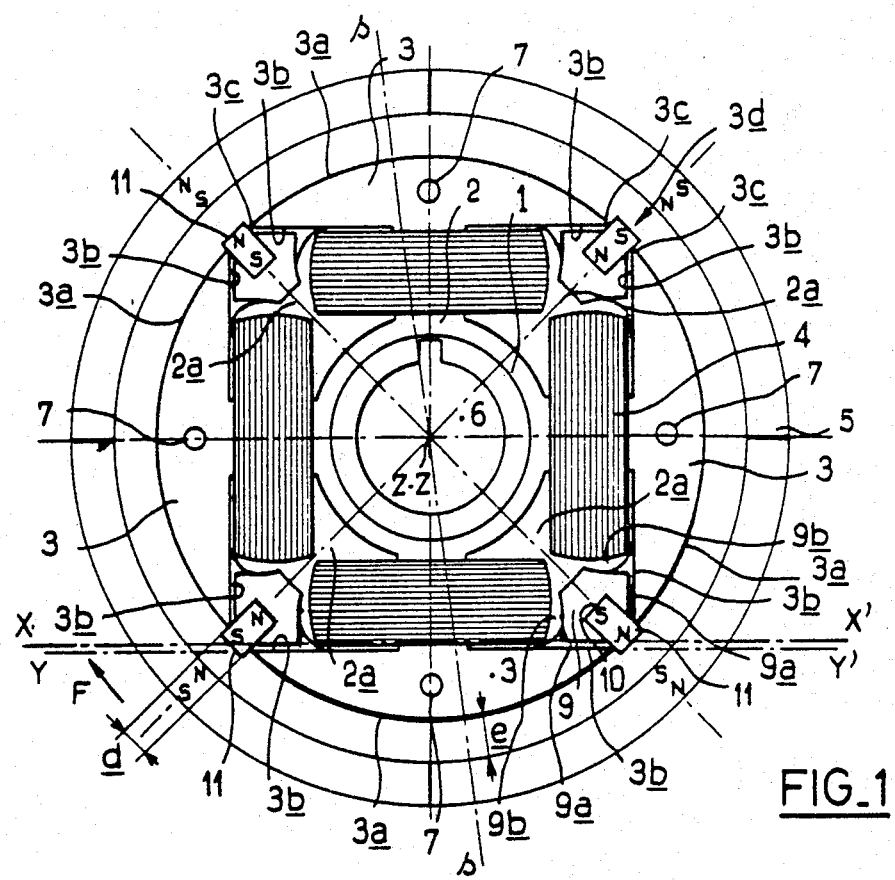
FIG. 1 is an axial schematic view of the motor in accordance with the invention on the side remote from the annular plate.
Figure 2:
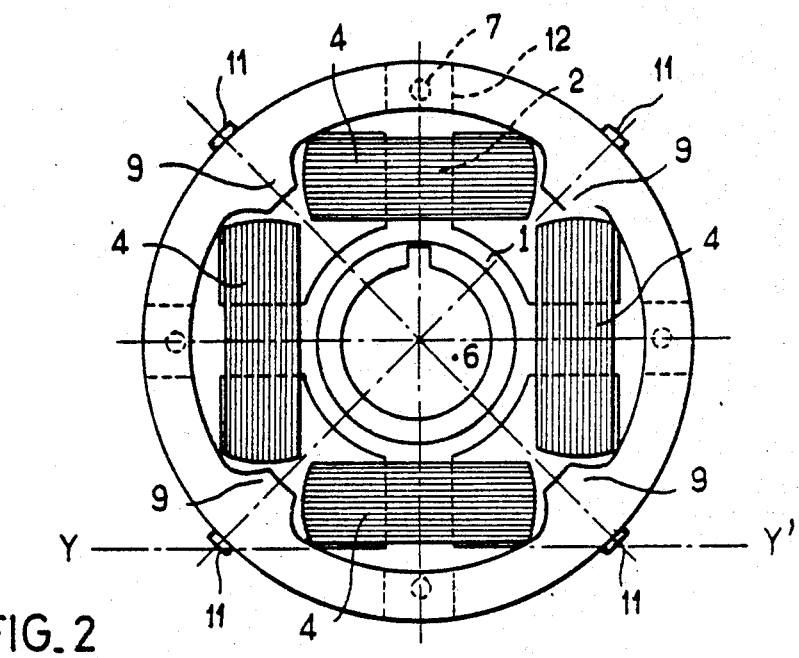
FIG. 2 is a view of the opposite side of the stator of the motor shown in FIG. 1.

The motor illustrated in the drawings is of the internal stator type. The stator shown in FIG. 1 comprises a yoke 1 of generally cylindrical shape having an axis Z-Z and adapted to carry arms 2 which are directed radially outwards. At the ends remote from the yoke 1, said arms are widened-out so as to form pole horns 3. The external lateral faces 3a of the horns 3 are convex cylindrical sectors having an axis Z-Z. In the example shown, the stator comprises four arms 2 spaced at angular intervals about the axis Z-Z and consequently four horns 3. The external lateral face 3a of each horn 3 extends over slightly less than 90° between two circumferential ends 3c. Thus a space 3d remains between the circumferential ends 3c of two adjacent horns 3 which are directed towards each other. Starting from each circumferential end 3c, the face 3a of each horn 3 is joined to the arm 2 by means of a rear face or shouldered portion 3b. The two rear faces 3b of each horn 3 extend in the same plane Y-Y40 at right angles to the radial direction of the associated arm 2. The assembly consisting of yoke 1, arms 2 and horns 3 is referred-to as a magnetic stator circuit.

Each arm 2 is surrounded by a stator winding 4. These windings partly occupy four inter-pole spaces 2a, each of which extends between the yoke 1, two adjacent arms 2 and the two half-horns extending from said arms 2 and directed towards each other. Each horn 3 is traversed by an axial bore 7 for the purpose of fixing the motor in an apparatus to be driven.

The rotor is an element having permanent magnetism and comprising a circular magnetic ring 5. At a radial distance e which constitutes an air-gap, said circular magnetic ring 5 surrounds the practically continuous cylindrical surface constituted by the four faces 3a of the stator. The rotor which comprises the ring 5 is capable of rotational motion relative to the stator, about the axis Z-Z of a shaft (not shown) housed within a central bore 6 of the stator. The magnetic ring 5 is adapted to carry permanent magnets having the profile of a quarter-circle. The faces of said magnets which are directed towards the horns 3 have alternately a north and south polarity along the internal periphery of the rotor.

In a motor of this type, it is known that a commutation or switching of current within the windings 4 in synchronism with the angular displacement of the ring 5 produces a torque which continuously tends to bring a magnetic axis of the rotor in coincidence with a magnetic axis of the stator, thereby ensuring that each face 3a of the stator is located opposite to a region of the rotor which is of opposite magnetic polarity. As soon as this coincidence is obtained (or a short time before it occurs), the current is switched within the windings 4 so as to modify the magnetic polarity of the faces 3a and thus to maintain the rotation.

If no other arrangement is made, a motor of this type is liable to be incapable of starting-up alone when current is supplied to the windings 4. In fact, if at the end of a previous period of use the motor has come to a standstill in an angular position such that the axis of its south poles is located in the position s-s shown in FIG. 1, that is to say just before reaching a magnetic axis of the stator relative to the direction of rotation F, then in that case the supply of current to the windings 4 will subject the rotor to very low torque, the value of which will prove insufficient to impart to the rotor the kinetic energy which is necessary in order to pass beyond the position of full coincidence of the axes. It will be noted incidentally that the magnetic axis s-s mentioned above corresponds to an angular position of the ring 5 which is not shown in the drawings.

In order to ensure that the ring 5 is not liable to come to rest in an angular position which no longer permits re-starting, the stator is provided in addition with four permanent auxiliary magnets 11, each magnet being engaged in one of the spaces 3d between two adjacent horns 3 and has a pole face in adjacent relation to the air-gap between the stator and the ring 5. Each auxiliary magnet 11 is magnetized radially with respect to the axis Z-Z, with the result that its other pole face is directed towards the axis Z-Z. When viewed from the air-gap e, the pole faces of the magnets 11 have north and south polarities in alternate sequence along the air-gap e in the circumferential direction. Preferably, the auxliary magnets 11 project within the air-gap e to a slight extent. By virtue of the auxiliary magnets 11, the stator is no longer magnetically neutral when no current flows through the windings 4 but has on the contrary magnetic axes which are displaced by 45° with respect to those formed by the supply of current to the windings 4. Thus, when no current is supplied, the rotor stops systematically in an angular position (shown in FIG. 1) in which its magnetic axes coincide with those determined by the auxiliary magnets 11. When the excitation is restored, the rotor must rotate through an angle of 45° in order to ensure that its magnetic axes coincide with those of the stator and this is sufficient to enable the rotor to attain a speed which subsequently makes it possible to maintain the rotation.

In accordance with the invention, each auxiliary magnet 11 forms a longitudinal projection carried by a post 9 which extends in a direction parallel to the axis Z-Z within the inter-pole space 2a and more precisely between the two adjacent windings 4 and the two shouldered portions 3b of the two adjacent half-horns which are directed towards each other.

Each post 9 has a cross-section in the shape of an irregular hexagon, one face of which is adapted to carry the auxiliary magnet 11, two external lateral faces 9a of which are located on each side of the auxiliary magnet 11 and are each adjacent to one of the shouldered portions 3b, and two internal oblique faces 9b of which are each adjacent to one of the windings 4.

The posts 9 are carried by an annular supportingplate 8 (as shown in FIGS. 3 to 5) which is mounted against an axial end-face of the horns 3 between the regions occupied by the windings 4 and the air-gap e. The external perimeter of the annular plate 8 coincides with the profile of the air-gap faces 3a. On the side which is applied against the magnetic circuit, the annular plate 8 is provided at the angular mid-distance between the successive posts 9 with recesses 12 (FIGS. 2-5) for accomodating the heads of the screws which are mounted within the bores 7 for securing the motor to the associated appliance.

The support composed of the annular plate 8 and posts 9 is formed in a single piece by molding, for example of electrically insulating plastic material.

As illustrated in FIG. 1 and irrespective of the pair of adjacent posts 9 considered, the two external faces 9a located between the two auxiliary magnets 11 are contained in the same axial plane X-X' which coincides with the plane Y-Y' (to within permissible adjustment tolerances). Thus at the time of assembly, these posts engage between the shouldered portions 3b and are capable of displacement in sliding motion but are secured against rotation. When viewed in a direction parallel to the axis Z-Z, the internal oblique faces 9b of the posts 9 have a slightly concave profile in order to engage between the windings 4 without effort.

In the example which is illustrated, each post 9 is provided on that face which carries the auxiliary magnet 11 with a groove 10 of rectangular cross-section in which the auxiliary magnet 11 is inserted. As shown in FIG. 4, the annular plate 8 extends radially beyond the posts 9 and each groove 10 is provided with an outward radial extension 10b formed within the thickness of the annular plate 8. The auxiliary magnet 11 which is engaged within the two portions 10 and 10b of the groove is thus more effectively positioned, especially in the axial direction.

The auxiliary magnets 11 are preferably of the type designated as a "rubber magnet", which designates a mixture of ferrite and elastomer material. The quality of elasticity of this material is in fact conducive to insertion of the auxliary magnets 11 in their grooves 10 in which they can subsequently be fixed by adhesive bonding, for example. The circumferential dimension d of the auxiliary magnets 11 in their projecting region of the groove 10 occupied by said magnets is equal (to within permissible tolerances) to the circumferential dimension of the space 3d in which they are engaged. In this case also, the elasticity of the auxiliary magnets 11 facilitates assembly.

At the time of assembly, the auxiliary magnets 11 are placed within their respective grooves 10. Once the windings 4 have been formed around the arms 2, the posts 9 are slidably engaged within the inter-pole spaces 2a until the annular plate 8 is applied against the horns 3. The complex interengagement of the posts 9 and of the auxiliary magnets 11 within the free spaces of the stator is sufficient to produce friction forces which have the effect of retaining the auxiliary magnets 11 and their supports in position. It would be possible, however, to bond or fix the annular plate 8 on the magnetic circuit in a different manner.

In an alternative embodiment which is illustrated in FIGS. 6 and 7, each auxiliary magnet is no longer an added part fitted within a groove of the posts but is constituted by a parallelepipedal projection 13 of the post 14 formed by molding in one piece with this latter and with the annular plate 15, which, as in the case of plate 8, is mounted against the end face of horns 3. As also in the case of post 9, the outer faces 9a of each post 14 have a profile which corresponds to that of shouldered portins 3b of pole horns 3 and the internal oblique face 9b has a profile which corresponds substantially to that of the winding 4. Similarly, as in the case of plate 8, the plate 15 extends against an axial end face of two horns 3 between a region occupied by the winding 4 and an air gap e. In this case the material employed is a magnetizable thermoplastic which is magnetized in the radial direction after, molding of the part and only within the region of projection 13. It will thus be seen that the annular plate 8, 15 is adapted to carry a post 9, 14 betwen each pair of adjacent horns 3 and the posts 9, 14 and the horns 3 have faces 3b, 9a which ensure guidance in sliding motion of the assembly comprising the posts 9, 14 and the annular plate 8, 15 relative to the electromagnetic elements.

As will readily be apparent, the invention is not limited to the examples described in the foregoing with reference to the accompanying drawings and any number of alternative arrangements may accordingly be made without thereby departing from the scope or the spirit of the invention.

Thus it follows that the invention is also applicable to external-stator motors. In an equally feasible arrangement, the electromagnetic element could constitute the rotor and the permanent-magnetism element could constitute the stator. Similarly, the motor considered in the foregoing can have any desired number of poles.

What is claimed is:

1. A direct-current motor comprising a permanent magnetism element which is provided opposite to an annular air-gap with at least two regions having opposite permanent magnetic polarities and which is mounted for rotational motion relative to an electromagnetic element comprising at least one winding and at least one yoke connected by means of arms to at least two adjacent pole horns located opposite to said air gap such that at least one of said arms is surrounded by said at least one winding, the motor comprising in addition a plurality of auxiliary permanent magnets each of which is positioned within a space between two adjacent circumferential ends of two adjacent pole horns, said ends being directed towards each other, each of said auxiliary permanent magnets being carried by a post accommodated within an inter-pole space provided between said yoke and said two adjacent horns, wherein the posts are carried by an annular plate mounted against an axial end face of the horns.

2. A motor according to claim 1, wherein each auxiliary magnet is inserted in a groove formed in the post.

3. A motor according to claim 2, wherein the annular plate extends radially beyond the post and the groove has an outward radial extendion within the thickness of said annular plate.

4. A motor according to claim 1, wherein each post and the adjacent auxiliary magnet which forms a longitudinal projection on said post are integral with each other and are made of magnetizable material and are, after molding, magnetized radially solely within the region of said longtudinal projection.

5. A motor according to claim 4, wherein the circumferential dimension of the longitudinal projection is, within permissible tolerances, equal to the circumferential dimension of said space formed between the circumferential ends of the two adjacent horns which are directed toward each other.

6. A motor according to claim 1, wherein outer faces of each post located on each side of the auxiliary magnet as seen in an axial view, have a profile which corresponds to that of a rear face of said adjacent circumferential ends of the pole horns.

7. A motor according to claim 6, wherein at least one of the outer faces of each post is joined at the edge remote from the auxiliary magnet to an inner face of said each post which is adjacent to said winding.

8. A motor according to claim 1, wherein the annular plate extends against an axial end face of the horns between a region occupied by the winding and the air-gap.

9. A motor according to claim 1, wherein the annular plate is adapted to carry said post between each pair of adjacent horns and wherein the posts and the horns have faces which ensure guidance in sliding motion of the assembly comprising the posts and the annular plate relative to the electromagnetic element.

* * * * *